US007660303B2

(12) United States Patent
Solomon et al.

(10) Patent No.: US 7,660,303 B2
(45) Date of Patent: Feb. 9, 2010

(54) POINT-TO-MULTIPOINT FUNCTIONALITY IN A BRIDGED NETWORK

(75) Inventors: Ronen Solomon, Givatayim (IL); Leon Bruckman, Petah Tikva (IL); Rafi Ram, Herzlia (IL); David Zelig, Ramat-Gan (IL); Shachar Katz, Raanana (IL)

(73) Assignee: Corrigent Systems Ltd., Tel Aviv (IL)

( * ) Notice: Subject to any disclaimer, the term of this patent is extended or adjusted under 35 U.S.C. 154(b) by 527 days.

(21) Appl. No.: 11/508,599

(22) Filed: Aug. 22, 2006

(65) Prior Publication Data

US 2008/0049764 A1    Feb. 28, 2008

(51) Int. Cl.
*H04L 12/28* (2006.01)
(52) U.S. Cl. .................................. 370/389; 370/401
(58) Field of Classification Search ........................ None
See application file for complete search history.

(56) References Cited

U.S. PATENT DOCUMENTS

| 4,535,785 | A | 8/1985 | van den Honert |
| 4,602,624 | A | 7/1986 | Naples et al. |
| 4,628,942 | A | 12/1986 | Sweeney et al. |
| 4,702,254 | A | 10/1987 | Zabara |
| 4,867,164 | A | 9/1989 | Zabara |
| 5,025,807 | A | 6/1991 | Zabara |
| 5,159,595 | A | 10/1992 | Flanagan et al. |
| 5,188,104 | A | 2/1993 | Wernicke |
| 5,199,430 | A | 4/1993 | Fang |
| 5,205,285 | A | 4/1993 | Baker, Jr. |
| 5,215,086 | A | 6/1993 | Terry, Jr. |
| 5,263,480 | A | 11/1993 | Wernicke |
| 5,282,468 | A | 2/1994 | Klepinski |
| 5,299,569 | A | 4/1994 | Wernicke |
| 5,307,353 | A | 4/1994 | Yamashita et al. |
| 5,321,393 | A | 6/1994 | Carlton et al. |
| 5,335,657 | A | 8/1994 | Terry, Jr. |
| 5,461,611 | A | 10/1995 | Drake et al. |

(Continued)

OTHER PUBLICATIONS

The IEEE Standard for Information Technology, Telecommunications And Information Exchange Between Systems, Local And Metropolitan Area Networks, Common Specifications, Part 3: Media Access Control (MAC) Bridges, Published As ANSI/IEEE Standard 802.1D (2004).

(Continued)

*Primary Examiner*—Chirag G Shah
*Assistant Examiner*—Otis L Thompson, Jr.
(74) *Attorney, Agent, or Firm*—Darby & Darby P.C.

(57) ABSTRACT

A method for communication includes coupling a group of switches in a Layer-2 bridged network. The interfaces of the switches are configured so that at least one interface of at least one of the switches is configured as a first interface type, and a plurality of other interfaces are configured as a second interface type. Upon receiving frames through the interfaces of the first and second types for transmission over the network, the received frames are labeled with corresponding first and second type indications. The frames are forwarded through the Layer-2 bridged network using the switches responsively to the type indications. Frames labeled with the second type indication are permitted to be transmitted through the interfaces of the first type and prevented from being transmitted through the interfaces of the second type.

20 Claims, 6 Drawing Sheets

U.S. PATENT DOCUMENTS

| | | |
|---|---|---|
| 5,540,730 A | 7/1996 | Terry, Jr. |
| 5,571,150 A | 11/1996 | Wernicke |
| 5,581,703 A | 12/1996 | Baugher et al. |
| 5,596,569 A | 1/1997 | Madonna et al. |
| 5,638,358 A | 6/1997 | Hagi et al. |
| 5,706,516 A | 1/1998 | Chang et al. |
| 5,707,400 A | 1/1998 | Terry, Jr. |
| 5,755,750 A | 5/1998 | Petruska |
| 5,925,137 A | 7/1999 | Okanoue et al. |
| 5,983,360 A | 11/1999 | Ugajin et al. |
| 6,021,263 A | 2/2000 | Kujoory et al. |
| 6,032,194 A | 2/2000 | Gai et al. |
| 6,147,993 A | 11/2000 | Kloth et al. |
| 6,151,297 A | 11/2000 | Congdon et al. |
| 6,205,359 B1 | 3/2001 | Boveja |
| 6,205,488 B1 | 3/2001 | Casey et al. |
| 6,233,073 B1 | 5/2001 | Bowers et al. |
| 6,246,667 B1 | 6/2001 | Ballantine et al. |
| 6,256,292 B1 | 7/2001 | Ellis et al. |
| 6,262,976 B1 | 7/2001 | McNamara |
| 6,275,493 B1 | 8/2001 | Morris et al. |
| 6,304,575 B1 | 10/2001 | Carroll et al. |
| 6,314,110 B1 | 11/2001 | Chin et al. |
| 6,330,229 B1 | 12/2001 | Jain et al. |
| 6,339,488 B1 | 1/2002 | Beshai et al. |
| 6,339,595 B1 | 1/2002 | Rekhter et al. |
| 6,359,858 B1 | 3/2002 | Smith et al. |
| 6,366,556 B1 | 4/2002 | Ballintine et al. |
| 6,370,121 B1 | 4/2002 | Hausman |
| 6,400,681 B1 | 6/2002 | Bertin et al. |
| 6,408,001 B1 | 6/2002 | Chuah et al. |
| 6,442,134 B1 | 8/2002 | Mitchell |
| 6,446,131 B1 | 9/2002 | Khansari et al. |
| 6,456,407 B1 | 9/2002 | Tammela et al. |
| 6,456,587 B2 | 9/2002 | Taniguchi |
| 6,466,985 B1 | 10/2002 | Goyal et al. |
| 6,563,793 B1 | 5/2003 | Golden et al. |
| 6,584,535 B1 | 6/2003 | Ouellet et al. |
| 6,604,136 B1 | 8/2003 | Chang et al. |
| 6,628,624 B1 | 9/2003 | Mahajan et al. |
| 6,636,478 B1 | 10/2003 | Sensel et al. |
| 6,639,893 B1 | 10/2003 | Chikenji et al. |
| 6,639,896 B1 | 10/2003 | Goode et al. |
| 6,647,008 B1 | 11/2003 | Galand et al. |
| 6,678,241 B1 | 1/2004 | Gai et al. |
| 6,680,906 B1 | 1/2004 | Nguyen |
| 6,680,912 B1 | 1/2004 | Kalman et al. |
| 6,711,125 B1 | 3/2004 | Walrand et al. |
| 6,724,880 B1 | 4/2004 | Lynch |
| 6,731,597 B1 | 5/2004 | Batchellor et al. |
| 6,735,198 B1 | 5/2004 | Edsall et al. |
| 6,757,286 B1 | 6/2004 | Stone |
| 6,760,775 B1 | 7/2004 | Anerousis et al. |
| 6,765,921 B1 | 7/2004 | Stacey et al. |
| 6,778,496 B1 | 8/2004 | Meempat et al. |
| 6,788,681 B1 | 9/2004 | Hurren et al. |
| 6,795,394 B1 | 9/2004 | Swinkels et al. |
| 6,801,506 B1 | 10/2004 | Dey |
| 6,820,210 B1 | 11/2004 | Daruwalla et al. |
| 6,826,158 B2 | 11/2004 | Seaman et al. |
| 6,831,932 B1 | 12/2004 | Boyle et al. |
| 6,879,559 B1 | 4/2005 | Blackmon et al. |
| 6,879,594 B1 | 4/2005 | Lee et al. |
| 6,886,043 B1 | 4/2005 | Mauger et al. |
| 6,922,394 B2 | 7/2005 | Kajiwara et al. |
| 6,925,054 B1 | 8/2005 | Atterton et al. |
| 6,934,259 B2 | 8/2005 | Klincewicz et al. |
| 6,985,447 B2 | 1/2006 | Gibson et al. |
| 7,035,279 B2 | 4/2006 | Bruckman et al. |
| 7,468,956 B1 * | 12/2008 | Leelanivas et al. .......... 370/255 |
| 2001/0022786 A1 | 9/2001 | King et al. |
| 2001/0033575 A1 | 10/2001 | Shimamura et al. |
| 2002/0015411 A1 | 2/2002 | Kataoka et al. |
| 2002/0018482 A1 | 2/2002 | Gotzer |
| 2002/0024974 A1 | 2/2002 | Karagiannis et al. |
| 2002/0091795 A1 * | 7/2002 | Yip ........................... 709/218 |
| 2002/0093949 A1 | 7/2002 | Yasue et al. |
| 2002/0118700 A1 | 8/2002 | Bruckman |
| 2002/0176371 A1 | 11/2002 | Behzadi |
| 2002/0176450 A1 | 11/2002 | Kong et al. |
| 2002/0179720 A1 | 12/2002 | Liva et al. |
| 2003/0002443 A1 | 1/2003 | Basso et al. |
| 2003/0009594 A1 | 1/2003 | McElligott |
| 2003/0026298 A1 | 2/2003 | Bisson et al. |
| 2003/0061338 A1 | 3/2003 | Stelliga |
| 2003/0074469 A1 | 4/2003 | Busi et al. |
| 2003/0088698 A1 | 5/2003 | Singh et al. |
| 2003/0147344 A1 | 8/2003 | Stewart et al. |
| 2003/0147345 A1 | 8/2003 | Takagi et al. |
| 2003/0154315 A1 | 8/2003 | Sultan et al. |
| 2003/0196135 A1 | 10/2003 | Gottlieb |
| 2003/0208618 A1 | 11/2003 | Mor et al. |
| 2004/0022268 A1 | 2/2004 | Busi et al. |
| 2004/0071089 A1 | 4/2004 | Bauer et al. |
| 2004/0101303 A1 | 5/2004 | Williams |
| 2004/0170184 A1 | 9/2004 | Hashimoto |
| 2004/0202171 A1 | 10/2004 | Hama |
| 2005/0025069 A1 * | 2/2005 | Aysan ....................... 370/254 |
| 2005/0135436 A1 | 6/2005 | Nigam et al. |
| 2005/0163115 A1 | 7/2005 | Dontu et al. |
| 2005/0226265 A1 | 10/2005 | Takatori |
| 2008/0031263 A1 | 2/2008 | Ervin et al. |

OTHER PUBLICATIONS

Malsen, et al., "MAC-Forced Forwarding: A Method For Subscriber Separation On An Ethernet Access Network", RFC 4562, Jun. 2006.

Mamakos, et al., "A Method For Transmitting PPP Over Ethernet (Pppoe)", RFC 2516, Feb. 1999.

McPherson, et al., "VLAN Aggregation for Efficient IP Address Allocation", RFC 3069, Feb. 2001.

Martini, et al., "Encapsulation Methods For Transport Of Ethernet Over MPLS Networks", RFC 4448, Apr. 2006.

Brayant, et al., "Pseudowire Emulation Edge-To-Edge (PWE3) Control Word For Use Over An MPLS PSN", RFC 4385, Feb. 2006.

U.S. Appl. No. 11/419,444.

Resen et al., Request for Comments (RFC) 3032 of the Internet Engineering Task Force (IETF), "MPLS Label Stack Encoding", Jan. 2001.

Baker, et al, in IETF RFC 1638, "PPP Bridging Control Protocol (BCP)", Jun. 1994.

Lasserre et al., in "Virtual Private LAN Services over MPLS" (IETF draft-lasserre-vkompella-ppvpn-vpls-02.txt, Jun. 2002 and Jan. 2003.

Awduche, et al., "Requirement for Traffic Engineering Over MPLS", published as IETF RFC 2702, Sep. 1999.

Deering, RFC 1112, "Host Extensions for IP Multicasting", Aug. 1989.

Bradley, et al., in IETF RFC 1490, "Multiprotocol Interconnect over Frame Relay", Jul. 1993.

* cited by examiner

POINT-TO-MULTIPOINT FUNCTIONALITY IN A BRIDGED NETWORK

FIELD OF THE INVENTION

The present invention relates generally to communication networks, and specifically to methods and systems for controlling frame transmission through bridged networks.

BACKGROUND OF THE INVENTION

Local Area Networks (LANs) connect computing systems together at the Layer-2 level. The term "Layer 2" refers to the second layer in the protocol stack defined by the well-known Open Systems Interface (OSI) model, also known as the logical link, data link, or Media Access Control (MAC) layer. Each computing system connects to a LAN through a MAC device. Multiple LANs can be connected together using MAC bridges, as set forth in the *IEEE Standard for Information Technology, Telecommunications and Information Exchange between Systems, Local and Metropolitan Area Networks, Common Specifications, Part 3: Media Access Control (MAC) Bridges*, published as ANSI/IEEE Standard 802.1D (2004), which is incorporated herein by reference. (The 802.1D standard, as well as other IEEE standards cited herein, is available at standards.ieee.org/catalog/.) MAC bridges that implement the 802.1D standard allow MAC devices attached to physically separated LANs to appear to each other as if they were attached to a single LAN. The bridge includes two or more MAC devices that interconnect the bridge ports to respective LANs.

MAC bridges maintain a forwarding database (FDB) to map destination MAC addresses of the frames they receive to bridge network interfaces (also referred to as ports). The bridge builds the forwarding database by means of a learning process, in which it associates the source MAC address of each incoming frame with the interface on which the frame was received. When the bridge receives an incoming frame whose destination address is not found in the database, it floods (i.e., broadcasts) the frame through all its available interfaces, except the one through which the frame arrived. Other MAC bridges that do not recognize the destination address will further flood the frame to all the relevant interfaces. Through the flooding mechanism, the frame will eventually traverse all interconnected bridges at least once, and will ultimately reach its destination.

Layer-2 bridged networks are generally configured to provide multipoint-to-multipoint connectivity among stations (i.e., computers) in the network. Some applications, however, require that certain stations in the network be separated and prevented from communicating directly with one another. For example, access networks deployed by Internet service providers (ISPs) are meant to provide connectivity between subscribing customer premises and ISP equipment, which provides access to the Internet and other network services. The ISP typically uses an aggregation network to aggregate and concentrate customer traffic to and from access routers that are connected to the public network. For security and other reasons, the ISP may wish to prevent customer premises from communicating directly with one another via the aggregation network.

Melsen et al. describe one method for preventing direct communication between subscribers in "MAC-Forced Forwarding: A Method for Subscriber Separation on an Ethernet Access Network," published by the Internet Engineering Task Force (IETF) as Request for Comments (RFC) 4562 (June, 2006), which is incorporated herein by reference. (This RFC, as well other documents published by the IETF that are cited hereinbelow, is available at www.ietf.org.) The method described in this RFC is based on an Address Resolution Protocol (ARP) proxy function that prohibits Ethernet MAC address resolution between hosts located within the same Internet Protocol version 4 (IPv4) subnet but at different customer premises. The effect of this proxy function is to direct all upstream traffic to an IPv4 gateway, which provides IP-layer connectivity between the hosts.

Melsen et al. describe a number of other solutions that may be deployed to prevent Layer-2 visibility between stations in an Ethernet access network. One possibility is to use the Point-to-Point Protocol over Ethernet (PPPoE), as defined by Mamakos et al. in IETF RFC 2516 (February, 1999). Melsen et al. point out, however, that this solution does not support efficient multicast, since frames must be replicated on each PPPoE session to all hosts in a given multicast group. Another possibility is to use a different Virtual Local Area Network (VLAN) for each customer premises network, as described by McPherson et al. in IETF RFC 3069 (February, 2001). According to Melsen et al., this solution also requires replication of multicast frames, is limited in scalability, and increases complexity of provisioning.

SUMMARY OF THE INVENTION

Embodiments of the present invention provide improved methods and systems for affording point-to-multipoint (P2MP) connectivity over a Layer-2 bridged network, while maintaining the underlying Layer-2 network architecture. These embodiments support an efficient IP (Layer-3) addressing scheme, which can use a single IP subnet across the network, so that all nodes belong to the same broadcast domain. Using these embodiments, a system operator can provision, add, and change nodes in the network easily and efficiently, with unlimited scalability.

In the embodiments of the present invention that are described hereinbelow, the interfaces of switches at the edge of a Layer-2 bridged network are configured as belonging to first and second types. In access network scenarios, for example, the first interface type may be a hub type, which connects to the Internet and public network services (or to a content center, such as a video distribution or video-on-demand service), while the second interface type is a spoke type, which connects to customer premises equipment. (Switches within the Layer-2 bridged network may also be connected to one another by a third type of interface, referred to hereinbelow as a network-type interface.)

Upon receiving frames through interfaces of the first and second types, the switches label the received frames with corresponding first and second type indications. These type indications are used in MAC learning and forwarding processes so as to prevent frames received through interfaces of the second type (such as spoke interfaces) from being transmitted through other interfaces of the second type. These frames may thus be transmitted out of the Layer-2 bridged network only through first-type (hub) interfaces. On the other hand, frames received through interfaces of the first type may be transmitted through any of the other interfaces.

Although the simplest P2MP model involves only a single hub with multiple spokes, the embodiments described herein can readily support multiple interfaces of the first type, each connected in its own P2MP topology with the second-type interfaces on the network. At the same time, multipoint-to-multipoint connectivity between the hubs is maintained. Some embodiments of the present invention, which are described hereinbelow, provide mechanisms that support reconfiguration of stations within the network while detecting and avoiding possible creation of Layer-2 loops.

There is therefore provided, in accordance with an embodiment of the present invention, a method for communication, including:

coupling a group of switches in a Layer-2 bridged network, each switch including multiple network interfaces;

configuring the interfaces so that at least one interface of at least one of the switches is configured as a first type of the interfaces, and a plurality of other interfaces are configured as a second type of the interfaces;

upon receiving frames through the interfaces of the first and second types for transmission over the network, labeling the received frames with corresponding first and second type indications; and forwarding the frames through the Layer-2 bridged network using the switches responsively to the type indications, such that the frames labeled with the first type indication are permitted to be transmitted through any of the interfaces, while the frames labeled with the second type indication are permitted to be transmitted through the interfaces of the first type and prevented from being transmitted through the interfaces of the second type.

In some embodiments, the Layer-2 bridged network is arranged for multipoint-to-multipoint connectivity, and configuring the interfaces includes configuring the at least one interface as a hub and the plurality of the other interfaces as spokes in a point-to-multipoint topology. Typically, coupling the group of switches includes connecting the spokes to customer premises equipment, and connecting the hub to a Layer-3 network, so as to define an access network that enables the customer premises equipment to access the Layer-3 network while preventing communication via the Layer-2 bridged network between the customer premises equipment on different spokes except via the hub. In a disclosed embodiment, all nodes in the Layer-2 bridged network are assigned addresses in a single network broadcast domain, so that a frame broadcast via the hub will reach the customer premises equipment on all of the spokes.

The Layer-2 bridged network may include at least one of an Ethernet network and a virtual Layer-2 network.

In a disclosed embodiment, configuring the interfaces includes assigning the interfaces that do not belong to the first or second type to a third type, such that upon receiving the frames through the interfaces of the third type, the switches leave the type indications of the frames unchanged.

In some embodiments, forwarding the frames includes, upon receiving through a first interface of a given switch a frame including a given destination address, looking up the destination address in a forwarding database, which contains an identification of at least a second interface through which the frame should be forwarded and a type designation of the destination address as being associated with the first or second type of the interfaces, and comparing the type designation with a type indication of the frame in order to determine whether to forward the frame through the second interface. Typically, comparing the type designation with the type indication includes discarding the frame if the frame includes the second type indication and the type designation indicates that the destination address is associated with the second type of the interfaces.

In disclosed embodiments, the method includes updating the forwarding database using a database learning process responsively to the source address of the frame and to the type indication of the frame. Typically, updating the forwarding database includes adding to the database an entry including the source address of the frame and a number identifying the first interface, wherein the type designation of the entry is set equal to the type indication of the frame.

Additionally or alternatively, the method includes, if the database contains an entry including the source address of the frame, and the type designation of the entry is associated with the first type of the interfaces while the frame is labeled with the second type indication, refraining from updating the entry. The method may include incrementing a counter upon refraining from updating the entry, and updating the entry to contain the type designation that is associated with the second type of the interfaces when the counter reaches a predetermined threshold. Further additionally or alternatively, the method may include receiving a configuration input indicating whether to discard the frame when the database contains the entry including the source address of the frame, and the type designation of the entry is associated with the first type of the interfaces while the frame is labeled with the second type indication, and determining whether to discard the frame responsively to the configuration input.

There is also provided, in accordance with an embodiment of the present invention, apparatus for communication, including a group of switches, which are coupled together in a Layer-2 bridged network, each switch including:

multiple network interfaces, which are configured so that at least one interface of at least one of the switches is configured as a first type of the interfaces, and a plurality of other interfaces are configured as a second type of the interfaces; and a frame processor, which is operative, upon receiving frames through the interfaces of the first and second types for transmission over the network, to label the received frames with corresponding first and second type indications, and to cause the interfaces to forward the frames through the Layer-2 bridged network responsively to the type indications, by permitting the frames that are labeled with the first type indication to be transmitted through any of the interfaces, while permitting the frames that are labeled with the second type indication to be transmitted through the interfaces of the first type and preventing the frames that are labeled with the second type indication from being transmitted through the interfaces of the second type.

The present invention will be more fully understood from the following detailed description of the embodiments thereof, taken together with the drawings in which:

DETAILED DESCRIPTION OF EMBODIMENTS

Figure 1:
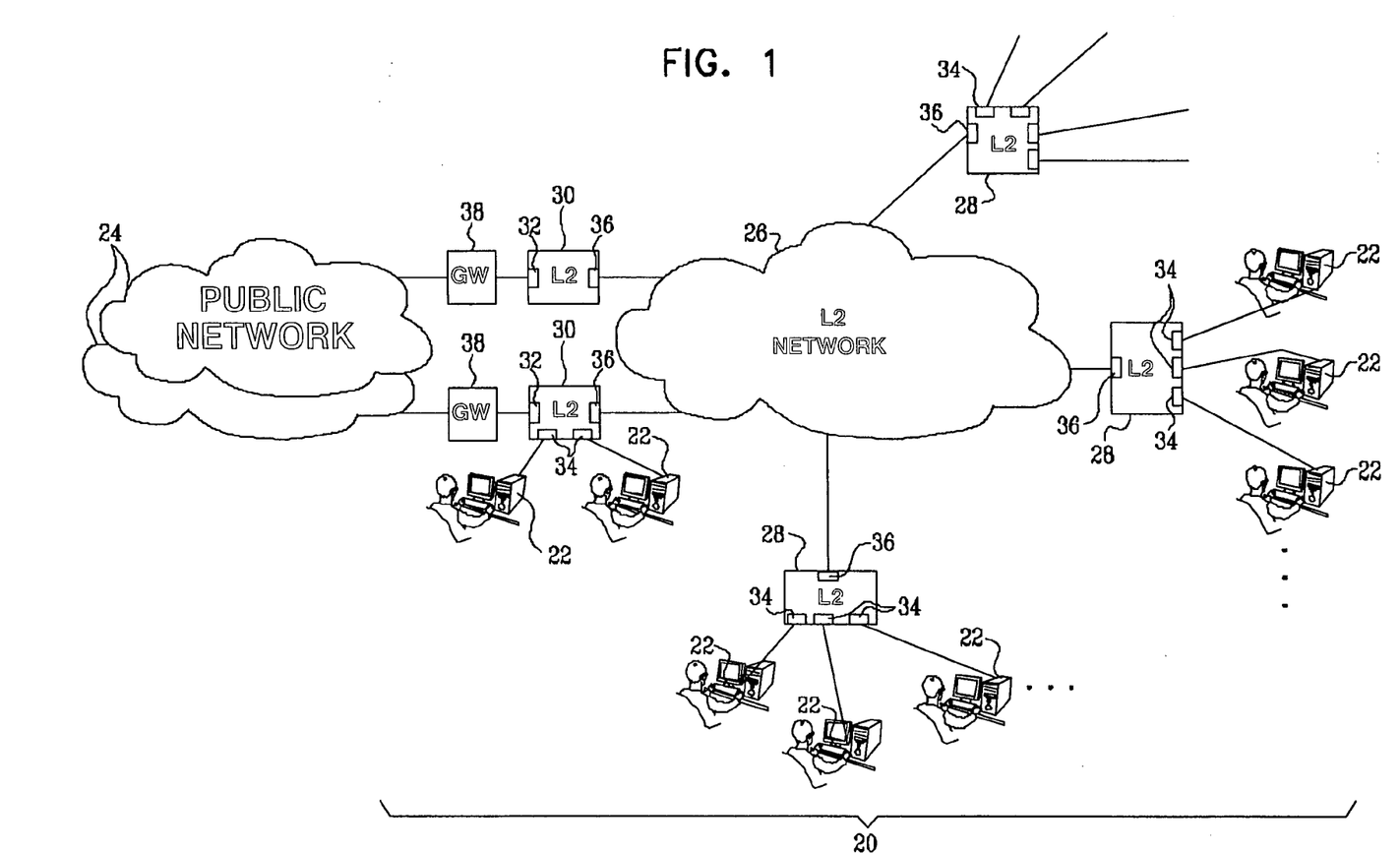
FIG. 1 is a block diagram that schematically illustrates an access network, in accordance with an embodiment of the present invention.

FIG. 1 is a block diagram that schematically illustrates an access network 20, in accordance with an embodiment of the present invention. Network 20 may be operated, for example, by an ISP in order to permit customer premises equipment (CPE), such as computers 22, to access one or more public networks 24, such as the Internet, via a Layer-2 bridged network 26. Network 20 is configured for P2MP operation between aggregation nodes 30 and computers 22, as is described in detail hereinbelow. This arrangement permits computers 22 to communicate with servers and other client computers via networks 24, as well as to receive network services, such as video over IP multicast. Typically, aggregation nodes 30 connect to networks 24 via suitable gateways 38, as are known in the art. Such gateways may be configured by the ISP to provide routing and security functions, and may also generate service records for billing purposes.

Alternatively, a similar configuration of network 20 may be used to aggregate communication traffic between multiple base stations transceivers and a central voice gateway in a Third-Generation (3G) cellular backhaul network. Other applications that may use the communication architecture described herein will be apparent to those skilled in the art and are considered to be within the scope of the present invention.

Computers 22 are connected to network 26 via Layer-2 bridge nodes 28. Nodes 28 and 30 typically comprise Layer-2 switches with MAC bridging capability. In addition to nodes 28 and 30 at the edges of network 26, the network may comprise additional core switches (not shown), linking bridge nodes 28 with aggregation nodes 30. Each switch comprises multiple interfaces, which may also be referred to as ports. The operator of network 20 configures the interfaces according to their function:

Hub-type interfaces 32 at the network edge connect nodes 30 with public networks 24, or more generally, with communication resources outside access network 20.

Spoke-type interfaces 34 at the network edge connect nodes 28 with customer premises equipment, such as computer 22, or more generally, with other end-points of the access network. For example, a customer may connect a customer-premises LAN (not shown) to a spoke-type interface.

Network-type interfaces 36 within network 26 connect nodes 28 and 30 with one another via bridged network 26.

Nodes 28 and 30 may comprise the same or similar types of Layer-2 switches, and aggregation nodes 30 may also have spoke-type interfaces 34 that connect to customer-premises equipment, as shown in FIG. 1.

Network 26 may comprise any suitable type of Layer-2 bridged network. For example, network 26 may be an Ethernet LAN, in which case interfaces 32, 34, 36 are physical Ethernet ports. As another example, network 26 may comprise a virtual bridged network, such as a virtual private LAN service (VPLS) provisioned over an underlying Layer-2 or Layer-3 network, or a VLAN broadcast domain. In this case, the node interfaces may comprise virtual interfaces or a mixture of physical ports and virtual interfaces. In one embodiment, network 26 comprises a VPLS that is provisioned over a Resilient Packet Ring (RPR) network, as described, for instance, in U.S. Patent Application Publication 2006/0109802, whose disclosure is incorporated herein by reference. In this case, Ethernet frames transmitted over network 26 are encapsulated in RPR packets, and the virtual interfaces in the VPLS are identified by the RPR MAC addresses of the corresponding ring network nodes.

Additionally or alternatively, Ethernet "pseudowires" may be provisioned over a network of tunnels through a Layer-3 network, such as Multi-Protocol Label Switching (MPLS) tunnels, as described by Martini et al., in "Encapsulation Methods for Transport of Ethernet over MPLS Networks," published as IETF RFC 4448 (April, 2006), which is incorporated herein by reference. Other types and combinations of bridged Layer-2 networks in which the principles of the present invention may be implemented will be apparent to those skilled in the art and are considered to be within the scope of the present invention.

It is characteristic of Layer-2 bridged networks that a station connected to any interface of any bridge may communicate with any other station on any other interface of any bridge. The interfaces of nodes 28 and 30 are configured, however, to restrict this connectivity so that spoke-type interfaces 34 may communicate (either directly or via., network-type interfaces 36) only with hub-type interfaces 32, and not with other spoke-type interfaces. In other words, a P2MP topology is created between each hub-type interface and computers 22. These computers are thus constrained to communicate over access network 20 only via the hub-type interfaces and are prevented from communicating directly with one another over the access network. As a result, all communications to and from computers 22 will typically pass through gateways 38, thus enabling the operator of network 20 to use the gateways in applying security and record-keeping measures. This arrangement prevents users of computers 22 from sending malicious traffic directly to other computers via access network 20 or otherwise exploiting the resources of the access network without authorization (and payment as appropriate). On the other hand, hub-type interfaces 32 may be permitted to communicate with one another, as well as with spoke-type interfaces 34, via network 26.

Figure 2:
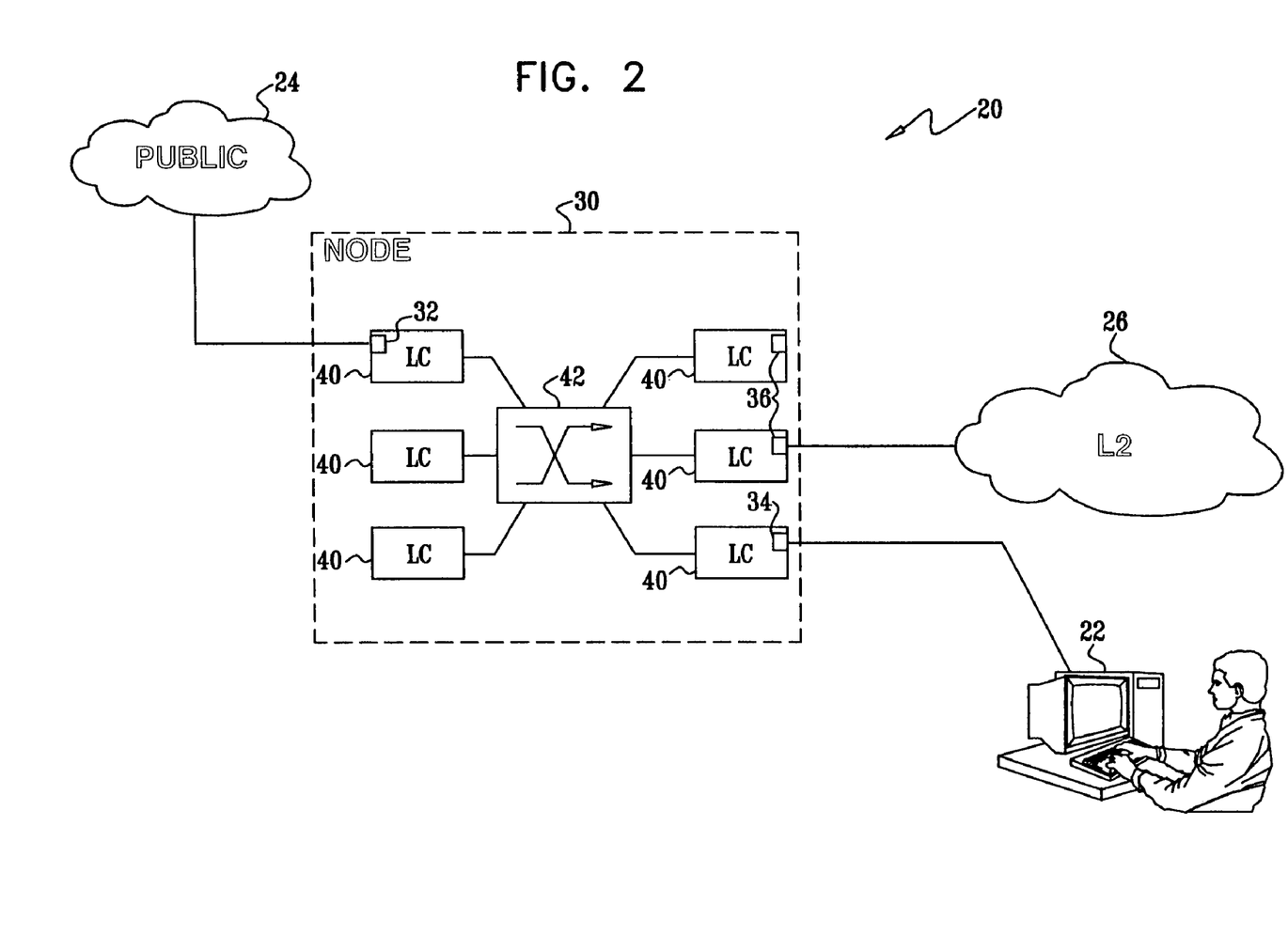
FIG. 2 is a block diagram that schematically shows details of a network switch, in accordance with an embodiment of the present invention.

FIG. 2 is a block diagram that schematically shows details of one of aggregation nodes 30, in accordance with an embodiment of the present invention. Bridge nodes 28 may be similar in structure and operation to the aggregation nodes. This embodiment is shown only by way of example, to aid in understanding one possible implementation of the present invention. The principles of the present invention may alternatively be implemented in substantially any type of Layer-2 switch, with any suitable internal structure, and all such alternative implementations are considered to within the scope of the present invention.

Node 30 comprises multiple line cards 40, linked by a switching core 42. At least one of line cards 40 comprises hub-type interface 32, which connects to public network 24. Typically, each line card may comprise multiple interfaces, although only a few interfaces are shown in FIG. 2 for the sake of simplicity. Different line cards may connect to network links of different types. Line cards 40 also comprise at least one network-type interface 36 and may comprise one or more spoke-type interfaces 34, connected to computer 22.

Figure 3:
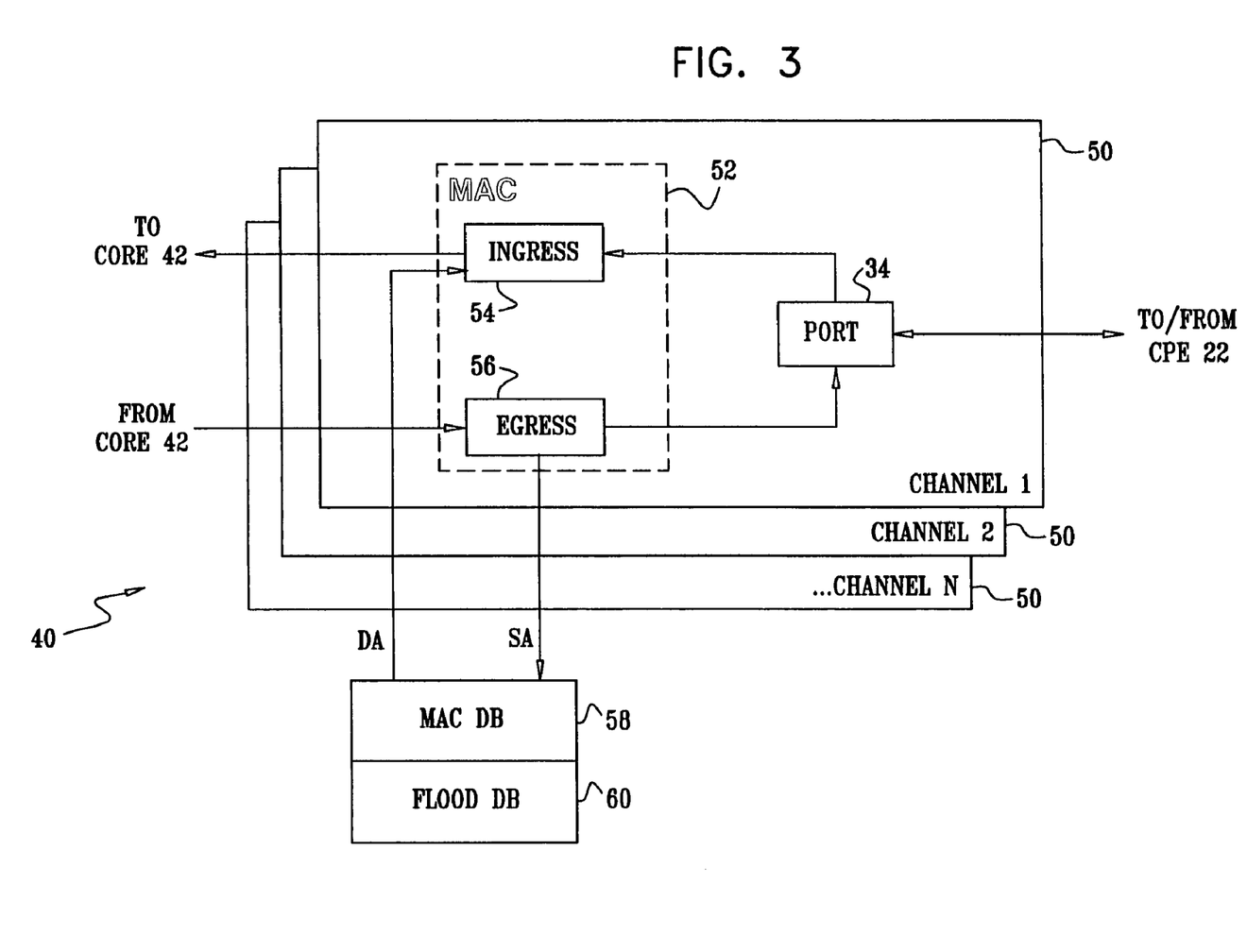
FIG. 3 is a block diagram that schematically shows details of a line card in a network switch, in accordance with an embodiment of the present invention.

FIG. 3 is a block diagram that schematically shows details of one of line cards 40 in node 30, in accordance with an embodiment of the present invention. In this example, interface 34 is identified as an Ethernet port, with is associated with a corresponding processing channel 50. The line card comprises N ports of this sort, with N corresponding processing channels. (Although each channel 50 is shown, for the sake of conceptual clarity, as a distinct functional block, in practice the channels may not be distinct physical devices, but may rather be implemented as threads or process carried out by a processing device that serves multiple ports.) Channel 50 comprises a frame processor 52, which comprises an ingress path 54 and an egress path 56. Frame processor 52 uses a MAC forwarding database (FDB) 58 and a flood database 60 for MAC learning and forwarding functions, which are described in detail hereinbelow. These databases are typically shared among the processing channels on line card 40. Further details of how a FDB may be built and used in a VPLS-based network are described in the above-mentioned U.S. Patent Application Publication 2006/0109802 and in U.S. patent application Ser. No. 11/419,444, filed May 19, 2006, which is assigned to the assignee of the present patent application and whose disclosure is incorporated herein by reference.

MAC FDB 58 may have the following general form:

TABLE I

SAMPLE MAC FDB

| VPLS ID | MAC address | VLAN ID | Interface number | UNI type | Move counter | Age |
|---------|-------------|---------|------------------|----------|--------------|------|
| 16 | A | 10 | 1 | H | 0 | 1:00 |
| 16 | B | 10 | 2 | S | 0 | 2:02 |
| 16 | C | 10 | 3 | S | 0 | 2:45 |

The MAC address, optional VLAN ID, and interface (port) number are similar to the comparable fields that are defined by the above-mentioned ANSI/IEEE Standard 802.1D. In other words, for each unicast MAC destination address and VLAN ID that may be carried by a frame that is received by the node in question, the table identifies the interface of the node through which the frame should be forwarded. As noted above, the "interface numbers" may refer to physical or virtual ports; and when Layer-2 frames are encapsulated in other Layer-2 frames, such as in the encapsulation defined by IEEE Standard 802.17b or in other types of MAC-in-MAC encapsulation, these virtual ports may be identified in the table above by the MAC addresses used in the encapsulating frames. (Forwarding of broadcast and multicast frames is determined by flood database 60.) When network 26 comprises a VPLS, the MAC FDB entries may also be resolved according to the VPLS ID, as described, for example, in the above-mentioned patent applications. An "age" field is used in purging stale entries from the MAC FDB, as described hereinbelow.

Two additional fields in MAC FDB 58 are used in enforcing and managing the P2MP network configuration:

The User Network Interface (UNI) type designation indicates, for each MAC address, whether the interface through which the MAC address will ultimately be reached at the network edge is a hub-type (H) or spoke-type (S) interface. (In other words, the UNI-type designation often refers not to the interface in the preceding "interface number" column of Table I, but rather to the UNI type of the interface on some other node in network 20 to which the computer 22 or gateway 38 bearing the specified MAC address is actually connected.) The UNI type of each interface is pre-configured by the network operator, typically by setting an appropriate flag in the memory of the line card on which the interface is located, for example. Processor 52 learns the UNI type designations in the course of the MAC learning process, as described hereinbelow, and fills the values into the MAC FDB along with the interface numbers.

The move counter is used in automatically recognizing network configuration changes (such as reconfiguration by the system operator of a hub-type interface as a spoke-type interface), while avoiding network flooding and corruption of the MAC FDB due to loops that may exist in customer premises networks, for example. Use of the move counter is described further hereinbelow with reference to FIG. 6.

Flood database 60 should also contain a UNI type designation for each interface to control forwarding of broadcast and multicast frames, as well as forwarding of unicast frames whose destination address does not appear in MAC FDB 58.

Figure 4:
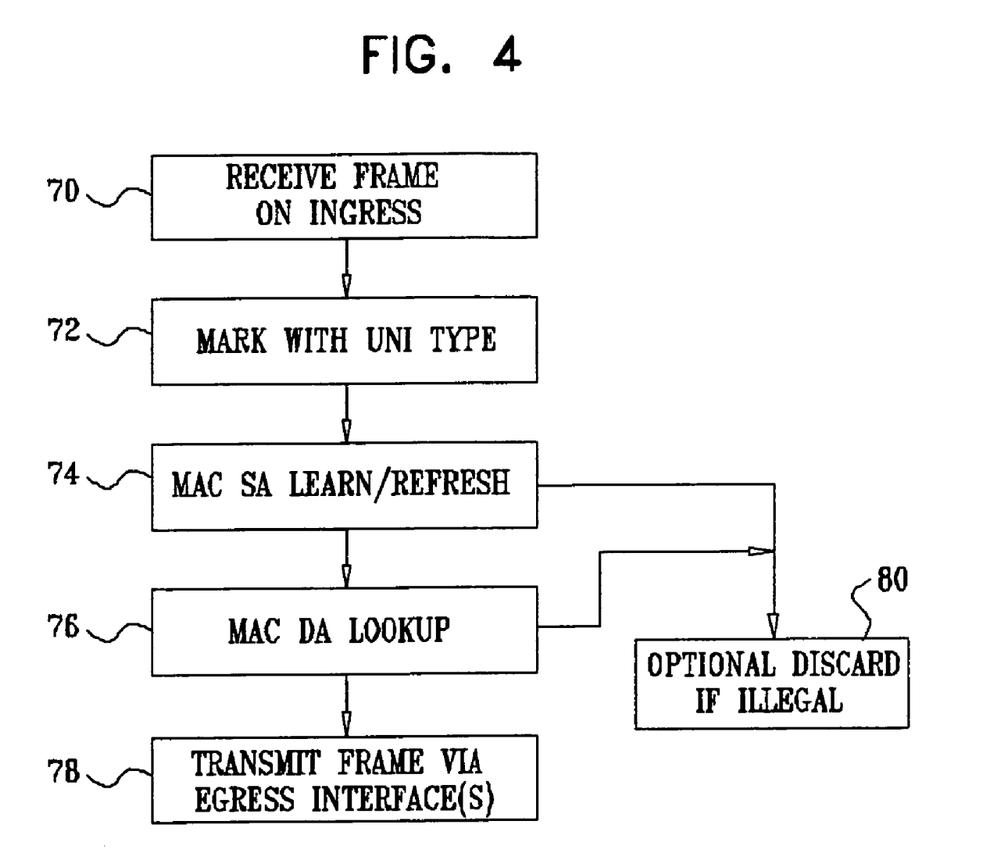
FIG. 4 is a flow chart that schematically illustrates a method for processing data frames, in accordance with an embodiment of the present invention.

FIG. 4 is a flow chart that schematically illustrates a method for processing data frames that is carried out by nodes 28 and 30, in accordance with an embodiment of the present invention. The method is initiated whenever one of nodes 28 or 30 receives a data frame for forwarding on the ingress side of one of the node interfaces, at a frame reception step 70. It is assumed that the UNI type of the ingress interface has already been configured by the system operator, as described above. Processor 52 marks the frame with a type indication in accordance with the UNI type, at a frame marking step 72. If the ingress interface is a hub- or spoke-type interface, processor 52 marks the frame accordingly. If the ingress interface is a network-type interface, then the frame will necessarily have been marked with the UNI type of the network-edge interface (hub or spoke) through which the frame entered the network. In this latter case, processor 52 leaves the UNI type indication of the frame unchanged.

Any suitable type indication may be used to mark the frame at step 72, as long as the other nodes in network 20 are programmed to recognize the indication. For example, the VLAN tag specified by IEEE standard 802.1Q includes a CFI bit, which is rarely used in practical network applications. The value of the CFI bit may thus be set to indicate whether the ingress interface is hub- or spoke-type. As another example, if network 20 comprises a set of virtual Ethernet connections over MPLS tunnels, as described in the above-mentioned RFC 4448, one of the bits of the inner pseudo-wire (PW) label may be used to indicate the UNI type. As a further alternative, a control word defined by Bryant et al., in "Pseudowire Emulation Edge-to-Edge (PWE3) Control Word for Use over an MPLS PSN" (IETF RFC 4385, February, 2006), may be used for this purpose.

After receiving and (if the ingress interface is not network-type) marking the frame, the node performs a MAC learning procedure with respect to the MAC source address (SA) of the frame, at a learning step 74. The learning procedure is described in detail hereinbelow with reference to FIG. 6. This procedure is based generally on the MAC learning and forwarding procedures defined in the above-mentioned ANSI/IEEE Standard 802.1D (particularly sections 7.7-7.9), with modifications to support the P2MP functionality of network 20. These procedures include an aging mechanism, whereby entries in the MAC FDB that are not referred to over a certain period of time are flushed from the database. To prevent aging out of "live" entries, when a node carrying out the learning procedure determines that there is already an entry in MAC FDB 58 corresponding to the MAC SA and ingress interface of the current frame, it refreshes the entry, i.e., resets the aging timer, which is shown in the last column of Table I.

On the other hand, if there is an entry in the MAC FDB corresponding to the MAC SA of the current frame but with an interface number different from the ingress interface of the current frame, handling of the frame will depend upon the values of the UNI type designation and move counter that are recorded in the FDB, as shown above in Table I. This decision process is described in greater detail hereinbelow with reference to FIG. 6. Briefly stated, under some circumstances, if the UNI type of the current frame is spoke-type, the node may determine that the frame may have originated as the result of a loop in customer premises equipment that is connected to one of spoke interfaces 34. In such cases, the node may optionally discard the frame, at a frame discard step 80, and does not change the interface number or UNI type designation of the corresponding entry in MAC FDB 58. The decision as to whether to drop or forward the packet under these circumstances may be pre-configured by the system operator.

The node that received the frame at step 70 determines the egress interface through which it should transmit the frame by looking up the MAC destination address (DA) of the frame, at a MAC lookup step 76. Again, this step follows the general lines of the procedures described in sections 7.7-7.9 of ANSI/IEEE Standard 802.1D with modifications relating to P2MP functionality. The node uses MAC FDB 58 to look up the egress interface for unicast frames, or else uses flood database 60 to determine the egress interface(s) for broadcast and multicast frames, as well as unicast frames whose MAC DA does not appear in MAC FDB 58. Unicast frames that have a spoke-type UNI indication and whose MAC DA is marked with a spoke-type UNI designation in FDB 58 are determined to be illegal and are therefore discarded at step 80. Other frames are transmitted through the appropriate egress interface(s) determined by step 76, at a frame forwarding step 78.

Although MAC learning step 74 precedes MAC lookup 76 in FIG. 4, the order of these steps may alternatively be reversed. For example, MAC lookup may be performed on the ingress line card of the node in order to determine the egress line card(s) to which the frame should be sent for forwarding. Each egress line card receives an indication of the interface through which the frame was received on ingress, and may then use MAC learning to fill in its own MAC FDB.

Figure 5:
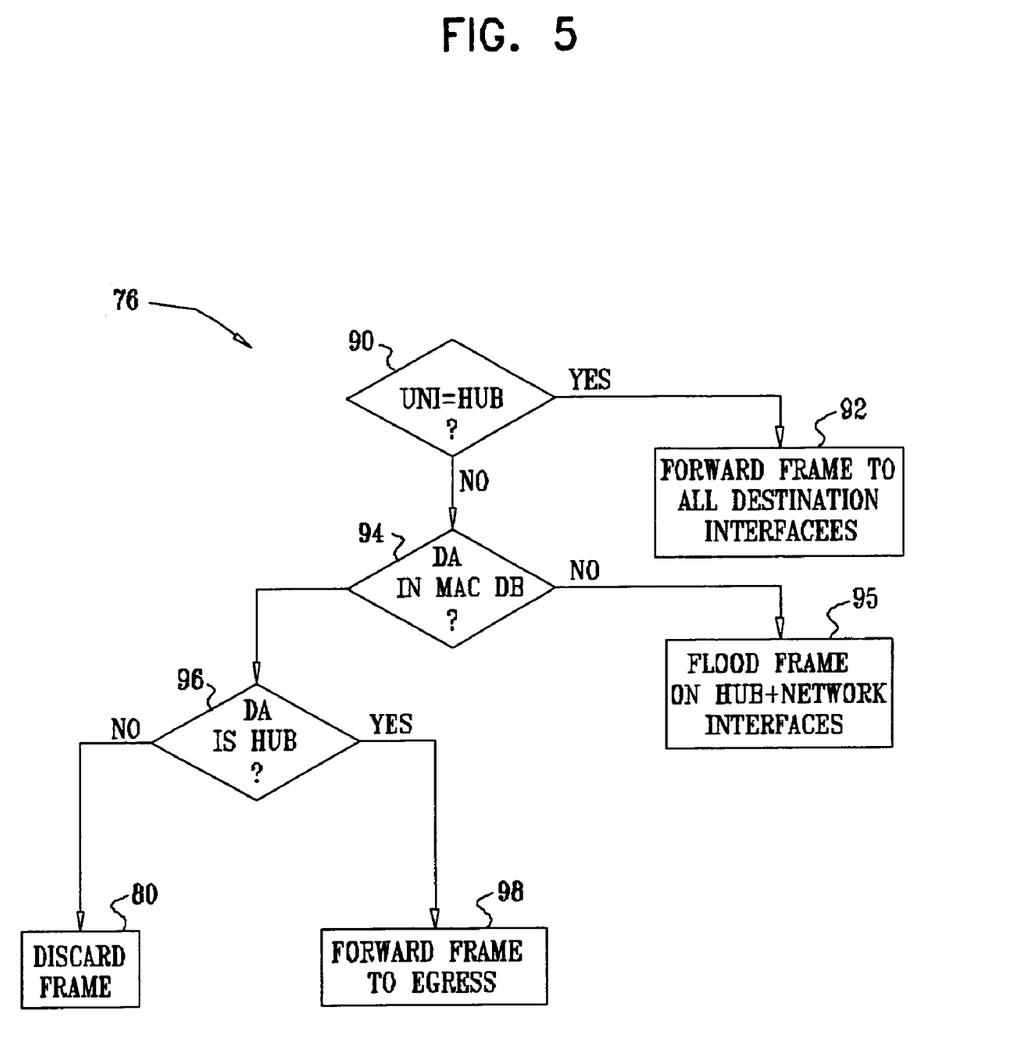
FIG. 5 is a flow chart that schematically illustrates a method for frame forwarding, in accordance with an embodiment of the present invention.

FIG. 5 is a flow chart that schematically shows details of MAC lookup step 76, in accordance with an embodiment of the present invention. Upon receiving a frame, the receiving node determines the UNI type indication of the frame, at a type determination step 90. If the frame indication is hub-type, the node simply looks up the MAC DA in MAC FDB 58 or flood database 60, and then forwards the frame to all destination interfaces indicated by the appropriate database, at a hub-type forwarding step 92. In other words, for hub-type frames, forwarding follows the multipoint-to-multipoint model.

If the frame is marked as spoke-type, the node also looks up the MAC DA, at a spoke look-up step 94. If the MAC DA is a unicast address but is not found in MAC FDB 58 at step 94, the node floods the frame on all of its interfaces that are designated as hub-type or network-type in flood database 60, at a flooding step 95. If the MAC DA is a multicast address, the node forwards the frame to all hub- and network-type interfaces in the multicast group that are listed in flood database 60, or to all of the hub- and network-type interfaces of the node in the case of a broadcast address. Spoke-type frames are not flooded to spoke-type interfaces.

If the MAC DA is a unicast address, and the address is found in MAC FDB 58 at step 94, the node checks the corresponding FDB entry to determine whether the UNI type designation for the MAC DA is hub-type or spoke-type, at a type checking step 96. If the UNI type is hub-type, the node forwards the frame to the egress interface listed in the MAC FDB. Otherwise, if the UNI type is spoke-type, the frame is discarded at step 80, in order to prevent frame transmission between different customer premises computers 22 that does not pass through at least one of gateways 38.

Figure 6:
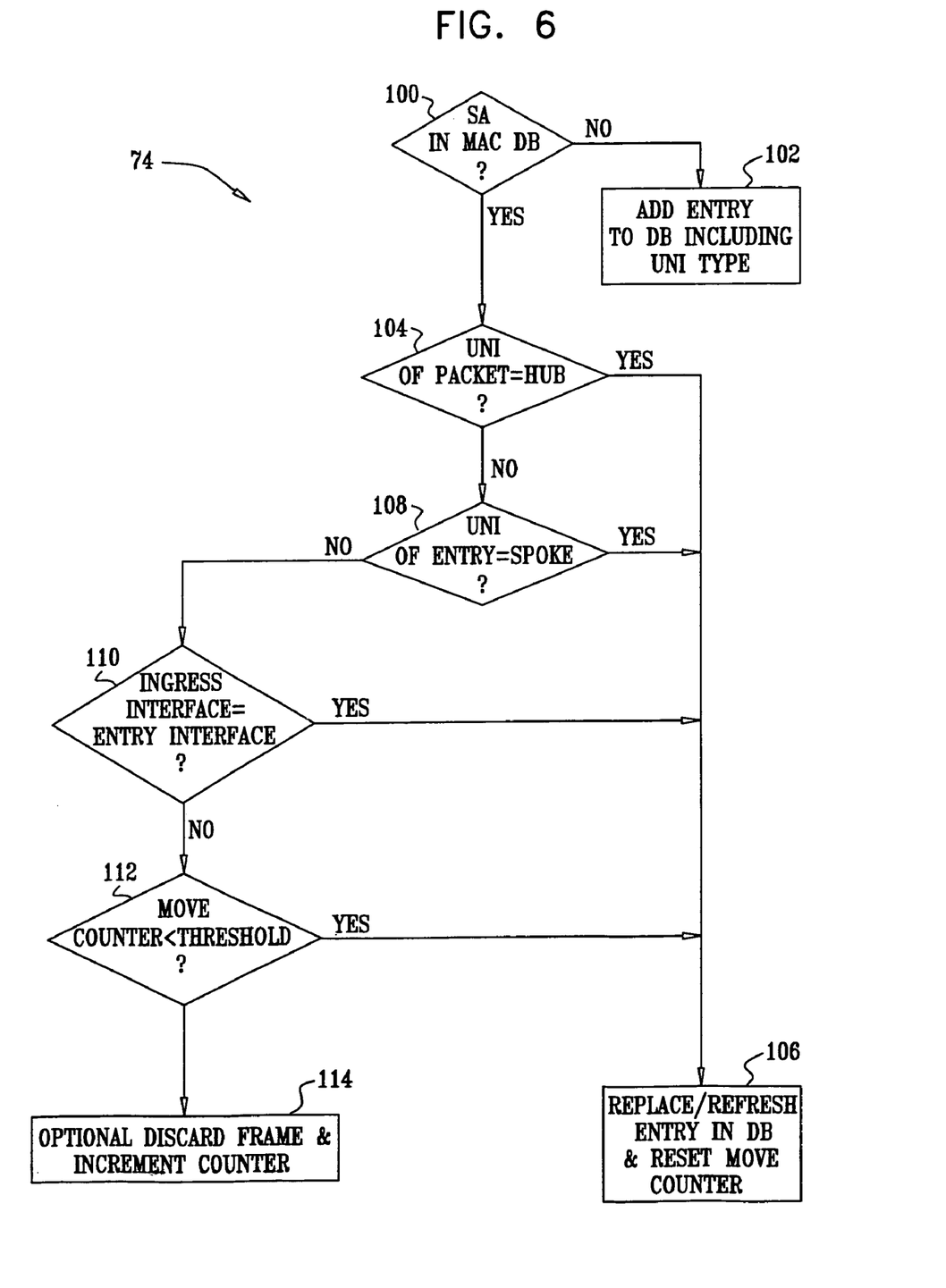
FIG. 6 is a flow chart that schematically illustrates a method for MAC address learning, in accordance with an embodiment of the present invention.

FIG. 6 is a flow chart that schematically shows details of MAC learning step 74, in accordance with an embodiment of the present invention. If the learning process is carried out at an interface that is a physical port on an Ethernet network, the learning process described hereinbelow refers to the actual MAC SA appearing in the frame header. In some virtual bridged networks, on the other hand, such as a VPLS, Layer-2 frames are encapsulated inside other packets. The encapsulating packets may also be Layer-2 frames, with their own MAC DA and MAC SA, as in the case of VPLS over RPR, described in the above-mentioned U.S. Patent Application Publication 2006/0109802, or MAC-in-MAC encapsulation using Provider Backbone Bridges, as described in IEEE draft standard 802.1ah. In such cases, the learning process creates entries in MAC FDB 58 that correspond to the MAC SA appearing in the encapsulated (inner) frame, while the "interface" listed in the MAC FDB for such entries will be the MAC address in the underlying physical network (such as the RPR MAC), which appears as the MAC SA of the encapsulating (outer) frame, as shown in the diagram below:

TABLE II

ENCAPSULATED MAC FRAME

| "Outer" (encapsulating) MAC header: | "Inner" (encapsulated) MAC header: | Payload |
|---|---|---|
| MAC SA → Interface number | MAC SA → MAC address in table | |

At the initiation of the learning process, the receiving node looks up the MAC SA of each received frame in the MAC FDB, at a source address lookup step 100. If there is no entry in the MAC FDB for this MAC address, the node creates a new entry, at an entry creation step 102. As shown in Table I above, the entry includes the MAC source address of the frame and the ingress interface (interface number or MAC SA in case of MAC-in-MAC encapsulation) through which the frame was received. The UNI type indication of the frame, as assigned at step 72 (FIG. 4), is recorded as the UNI type designation of the entry. The entry may also include a VPLS and/or VLAN ID. The move counter in the entry is set to zero, and the aging timer is reset.

If there is already an entry in the MAC FDB corresponding to the MAC SA of the current frame, the node checks the UNI type indication of the frame, at a frame type checking step 104. If the frame is marked as hub-type, the node updates the entry in the MAC FDB, at an entry update step 106, and resets the aging timer and move counter. At this step, if the ingress interface through which the frame was received and the UNI type indication of the frame are the same as the interface and UNI type designation listed in the entry, the node simply refreshes the entry, i.e., resets the aging timer and sets the move counter to zero.

Alternatively, at step 106, the node may find that the ingress interface through which the hub-type frame was received may be different from the interface that is listed in the MAC FDB entry for the MAC SA of the frame, or the UNI type designation of the entry may be spoke-type. It is assumed that changes of these sorts resulted from moving stations or reconfiguring interfaces in the network. In such cases, the node updates the entry in the MAC FDB corresponding to the MAC SA of the frame to reflect the new interface and/or UNI type. It also resets the aging timer and sets the move counter of the entry to zero.

On the other hand, if the UNI type indication of the frame is spoke-type, the node checks whether the UNI type designation of the entry in MAC FDB 58 corresponding to the MAC SA of the frame is hub-type or spoke-type, at an entry type checking step 108. If the entry in the MAC FDB is also designated as spoke-type, then the node refreshes the entry at step 106, in the manner described above.

If the UNI type designation of the entry in the MAC FDB is found to be hub-type at step 108, however, care must be taken to ensure that the current frame did not reach the present node as the result of passing through a loop in customer premises equipment. For example, it may occur that a frame was initially received in the network through one of interfaces 32 of one of nodes 30 (FIG. 1), whereupon it was marked with a hub-type UNI type indication, and was then transmitted out of the network via one of interfaces 34 of one of nodes 28 and looped back through that interface (or through another interface) to node 28. Node 28 will now set the frame UNI type indication to spoke-type, while maintaining the original MAC SA. In the absence of the present loop-prevention mechanism, nodes 28 would then attempt to replace the current entry for this MAC address in the MAC FDB and forward the frame through network 26. The following steps enable the nodes to avoid this sort of eventuality.

Upon receiving a frame with a spoke-type UNI indication and a MAC SA for which the UNI type designation of the corresponding entry in MAC FDB 58 is hub-type, the node compares the number of the ingress interface through which the node received the frame to the number of the interface appearing in the corresponding entry in the MAC FDB, at an interface comparison step 110. If the interface numbers are identical, it can be assumed that the system operator has simply reconfigured the interface from hub-type to spoke-type. In this case, the entry in the MAC FDB is updated to reflect the changed interface UNI type at step 106. The aging timer and move counter are reset, as explained above.

If the interface numbers do not match at step 110, the reason may be either that a station was moved from a hub-type interface to a spoke-type interface, or that the current frame has been looped back through the customer premises network. To avoid retransmission of a looped frame, the node checks the value of the move counter (Table I) in the corresponding entry in the MAC FDB, at a counter checking step 112. This counter indicates the number of successive frames that have been received from the MAC SA of the current frame through an ingress interface that does not match the interface indicated by the corresponding entry in the MAC FDB. Each time a new frame from this MAC SA with a non-matching ingress interface is received, the move counter is incremented until it reaches a predetermined threshold, at an incrementation step 114. Until the threshold is reached, these frames may be either discarded or forwarded (notwithstanding the possible loop), depending on preset configuration parameters. MAC FDB re-learning, however, will not take effect until the move counter has reached its threshold.

After the move counter has been incremented at step 114 due to a frame looped back through the spoke-type interface, the next frame arriving with this same MAC SA will generally come from the original hub-type interface. As a consequence, this frame will result in resetting the move counter at step 106. Therefore, it may be sufficient to use a threshold value of one may be sufficient, since the move counter will never reach the threshold at step 112 (because the process will not pass through the step twice in succession for a given MAC SA). Therefore, the corresponding MAC entry will not be updated. A larger value of the threshold may be set, however, in order to avoid possible problems due to multiple customer premises loops.

On the other hand, if the change in the ingress interface number and type (from hub-type to spoke-type) for the given MAC SA occurred because the system operator moved a station from a hub-type interface to a spoke-type interface, the originating computer will continue transmitting frames from this MAC SA through the spoke-type interface until the move counter reaches the threshold at step 112. At this point, the node updates the interface number in the corresponding entry in the MAC FDB at step 106. The node also changes the UNI type designation to spoke-type, and resets the aging timer and move counter.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication, comprising:
coupling a group of switches in a Layer-2 bridged network, each switch comprising multiple network interfaces;
configuring the interfaces so that at least one interface of at least one of the switches is configured as a first type of the interfaces, and a plurality of other interfaces are configured as a second type of the interfaces;
upon receiving frames through the interfaces of the first and second types for transmission over the network, labeling the received frames with corresponding first and second type indications;
forwarding the frames through the Layer-2 bridged network using the switches responsively to the type indications, such that the frames labeled with the first type indication are permitted to be transmitted through any of the interfaces, while the frames labeled with the second type indication are permitted to be transmitted through the interfaces of the first type and prevented from being transmitted through the interfaces of the second type;
wherein forwarding the frames comprises, upon receiving through a first interface of a given switch a frame comprising a given destination address:
looking up the destination address in a forwarding database, further containing an identification of at least a second interface through which the frame should be forwarded and a type designation of the destination address as being associated with the first or second type of the interfaces; and
comparing the type designation with a type indication of the frame in order to determine whether to forward the frame through the second interface;
receiving through a first interface of a given switch a frame comprising a source address;
creating an entry comprising the source address and a type number equal to a type indication of the frame;
adding the entry to the forwarding database; and
updating the forwarding database using a database learning process responsively to the source address and to the type indication of the frame.

2. The method according to claim 1, wherein the Layer-2 bridged network is arranged for multipoint-to-multipoint connectivity, and wherein configuring the interfaces comprises configuring the at least one interface as a hub and the plurality of the other interfaces as spokes in a point-to-multipoint topology.

3. The method according to claim 2, wherein coupling the group of switches comprises connecting the spokes to customer premises equipment, and connecting the hub to a Layer-3 network, so as to define an access network that enables the customer premises equipment to access the Layer-3 network while preventing communication via the Layer-2 bridged network between the customer premises equipment on different spokes except via the hub.

4. The method according to claim 3, wherein all nodes in the Layer-2 bridged network are assigned addresses in a single network broadcast domain, so that a frame broadcast via the hub will reach the customer premises equipment on all of the spokes.

5. The method according to claim 1, wherein the Layer-2 bridged network comprises at least one of an Ethernet network and a virtual Layer-2 network.

6. The method according to claim 1, wherein configuring the interfaces comprises assigning the interfaces that do not belong to the first or second type to a third type, such that upon receiving the frames through the interfaces of the third type, the switches leave the type indications of the frames unchanged.

7. The method according to claim 1, wherein comparing the type designation with the type indication comprises discarding the frame if the frame comprises the second type indication and the type designation indicates that the destination address is associated with the second type of the interfaces.

8. The method according to claim 1, and comprising, if the database contains an entry comprising the source address of the frame, and the type designation of the entry is associated with the first type of the interfaces while the frame is labeled with the second type indication, refraining from updating the entry.

9. The method according to claim 8, and comprising incrementing a counter upon refraining from updating the entry, and updating the entry to contain the type designation that is associated with the second type of the interfaces when the counter reaches a predetermined threshold.

10. The method according to claim 8, and comprising receiving a configuration input indicating whether to discard the frame when the database contains the entry comprising the source address of the frame, and the type designation of the entry is associated with the first type of the interfaces while the frame is labeled with the second type indication, and determining whether to discard the frame responsively to the configuration input.

11. Apparatus for communication, comprising a group of switches, which are coupled together in a Layer-2 bridged network, each switch comprising:
multiple network interfaces, which are configured so that at least one interface of at least one of the switches is configured as a first type of the interfaces, and a plurality of other interfaces are configured as a second type of the interfaces; and a frame processor, which is operative:
to create an entry comprising a source address of the frame and a number equal to a type indication of the frame to identify the first interface, and to add the entry to a forwarding database containing an identification of at least a second interface through which the frame should be forwarded and a type designation of the destination address as being associated with the first or second type of the interfaces;
upon receiving through a first interface of a given switch a frame comprising a given destination address, to look up the destination address in the forwarding database, and to compare the type designation with a type indication of the frame in order to determine whether to forward the frame through the second interface;
upon receiving frames through the interfaces of the first and second types for transmission over the network, to label the received frames with corresponding first and second type indications, and to cause the interfaces to forward the frames through the Layer-2 bridged network responsively to the type indications, by permitting the frames that are labeled with the first type indication to be transmitted through any of the interfaces, while permitting the frames that are labeled with the second type indication to be transmitted through the interfaces of the first type and preventing the frames that are labeled with the second type indication from being transmitted through the interfaces of the second type; and
to update the forwarding database using a database learning process responsively to the source address and to the type indication of the frame.

12. The apparatus according to claim 11, wherein the Layer-2 bridged network is arranged for multipoint-to-multipoint connectivity, and wherein the at least one interface is configured as a hub, while the plurality of the other interfaces are configured as spokes in a point-to-multipoint topology.

13. The apparatus according to claim 12, wherein the spokes are connected to customer premises equipment, and the hub is connected to a Layer-3 network, so as to define an access network that enables the customer premises equipment to access the Layer-3 network while preventing communication via the Layer-2 bridged network between the customer premises equipment on different spokes except via the hub.

14. The apparatus according to claim 13, wherein all nodes in the Layer-2 bridged network are assigned addresses in a single network broadcast domain, so that a frame broadcast via the hub will reach the customer premises equipment on all of the spokes.

15. The apparatus according to claim 11, wherein the Layer-2 bridged network comprises at least one of an Ethernet network and a virtual Layer-2 network.

16. The apparatus, according to claim 11, wherein the interfaces that do not belong to the first or second type are assigned to a third type, and wherein upon receiving the frames through the interfaces of the third type, the frame processor leaves the type indications of the frames unchanged.

17. The apparatus according to claim 11, wherein the frame processor is arranged to discard the frame if the frame comprises the second type indication and the type designation indicates that the destination address is associated with the second type of the interfaces.

18. The apparatus according to claim 11, wherein the frame processor is arranged to discard the frame without updating the entry if the database contains an entry comprising the source address of the frame, and the type designation of the entry is associated with the first type of the interfaces while the frame is labeled with the second type indication.

19. The apparatus according to claim 18, wherein the frame processor is operative to increment a counter upon discarding the frame, and to update the entry to contain the type designation that is associated with the second type of the interfaces when the counter reaches a predetermined threshold.

20. The apparatus according to claim 18, wherein the frame processor is coupled to receive a configuration input indicating whether to discard the frame when the database contains the entry comprising the source address of the frame, and the type designation of the entry is associated with the first type of the interfaces while the frame is labeled with the second type indication, and is arranged to determine whether to discard the frame responsively to the configuration input.

* * * * *